United States Patent [19]

Ertingshausen et al.

[11] Patent Number: 4,795,981
[45] Date of Patent: Jan. 3, 1989

[54] METHOD FOR MONITORING THE PERFORMANCE OF THE HEAD-DISK-INTERFACE AND DEVICE FOR PREVENTING DATA LOSSES DUE TO MAGNETIC HEAD-DISK-INTERFERENCES

[75] Inventors: Friedrich Ertingshausen, Nieder-Olm; Jens D. Mehrens, Ober-Olm, both of Fed. Rep. of Germany

[73] Assignee: International Business Machines Corporation, Armonk, N.Y.

[21] Appl. No.: 33,384

[22] Filed: Mar. 31, 1987

[30] Foreign Application Priority Data

Apr. 4, 1986 [DE] Fed. Rep. of Germany ..... 86104599

[51] Int. Cl.[4] ............................................ G01N 27/60
[52] U.S. Cl. ..................................... 324/454; 360/103
[58] Field of Search ............... 324/452, 454, 457, 113, 324/210, 212; 360/31, 103, 102, 75, 105

[56] References Cited

U.S. PATENT DOCUMENTS

| | | | |
|---|---|---|---|
| 3,329,943 | 7/1967 | Tanguy, Jr. et al. | 360/103 |
| 3,560,946 | 2/1971 | Ehalt et al. | 360/102 X |
| 3,634,835 | 1/1972 | Houston | 360/103 |
| 4,479,090 | 10/1984 | Frater et al. | 324/454 |
| 4,532,802 | 8/1985 | Yeack-Scranton et al. | 324/212 X |
| 4,635,139 | 1/1987 | Nguyen et al. | 324/212 X |

FOREIGN PATENT DOCUMENTS

| | | |
|---|---|---|
| 57-60566 | 4/1982 | Japan . |
| 58-224469 | 12/1983 | Japan . |
| 0001177 | 1/1987 | Japan ................................. 360/103 |

*Primary Examiner*—Reinhard J. Eisenzopf
*Assistant Examiner*—Jack B. Harvey
*Attorney, Agent, or Firm*—Otto Schmid, Jr.

[57] ABSTRACT

A method and apparatus is described by which, in magnetic disk storage systems where a triboelectric current can be observed to flow between slider and disk surface, a saving signal can be generated by which a saving action can be initiated to save the data on the storage system before they are lost irreversibly. The triboelectric current is monitored and checked during start phase, and if certain values and conditions are not fulfilled, the saving action is initiatable by the TRIC signal, which is generated by an evaluation and analyzer circuit upon the occurrence of certain events such as the triboelectric current not reaching at least a predetermined threshold value during start phase, the triboelectric current becoming negative, or the triboelectric current reaching a non-zero value when the magnetic disk storage system reaches operational speed.

16 Claims, 2 Drawing Sheets

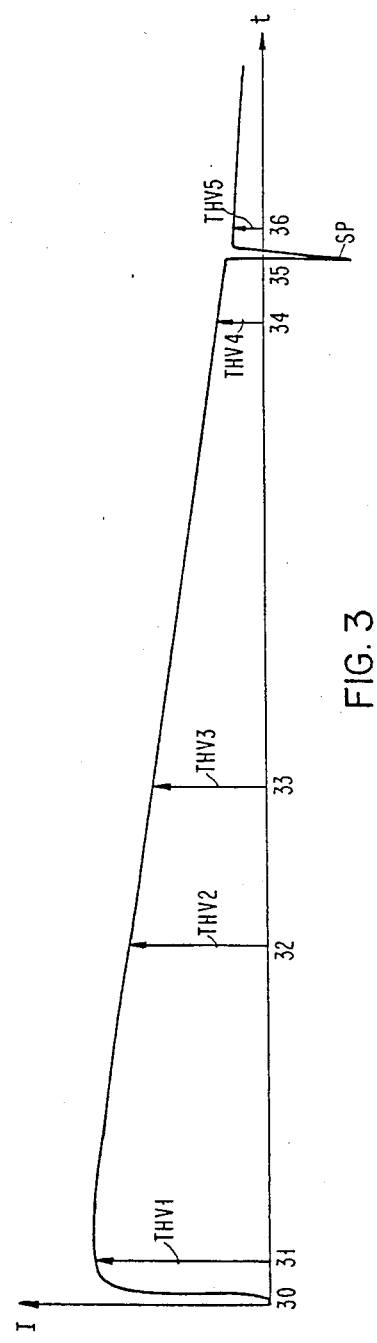
FIG. 3
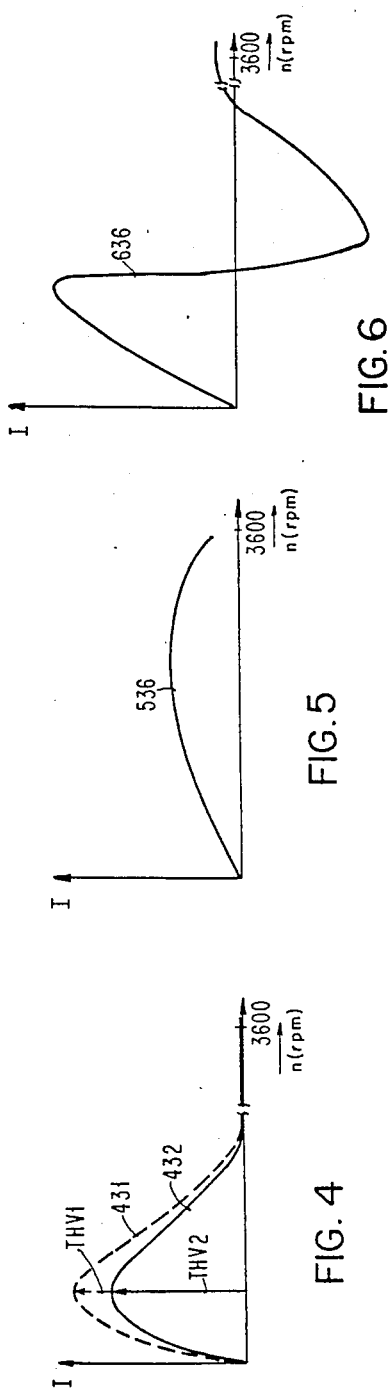
FIG. 6
FIG. 5
FIG. 4

METHOD FOR MONITORING THE PERFORMANCE OF THE HEAD-DISK-INTERFACE AND DEVICE FOR PREVENTING DATA LOSSES DUE TO MAGNETIC HEAD-DISK-INTERFERENCES

BACKGROUND OF THE INVENTION

1. Field of the Invention

The present invention generally relates to magnetic disk storage technology and, more particularly, to a method for monitoring the performance of the interface of a head/slider combination and a magnetic disk, especially a magnetic disk storage system, in which a triboelectric current is generated due to rubbing contact between slider and disk surface. The present invention also pertains to a device for preventing data losses due to head-slider/disk interferences in magnetic disk storage systems in which a triboelectric current is observed.

2. Prior Art

In magnetic disk storage systems the interface between the combination consisting of the magnetic transducer head and the slider and the surface of the magneti disk is of great importance. As the slider carries the head and contains air bearing surfaces and slides during normal disk operation on an extremely thin air cushion over the disk surface, the possibility of interferences between head and disk, so-called head disk interferences (HDI) where the head touches the surface of the disk, cannot be excluded. So HDIs are very detrimental both to the slider and its suspension and also to the surface of the disk. This can lead to irreversible damages to the surface of the disk and to the head-slider combination. In both cases irreversible data losses are possible and are to be guarded against.

In accordance with the commonly assigned Patent Application entitled "System for Testing Magnetic Head/Disk Interfaces" Ser. No. 856,306, filed 4-28-86, now U.S. Pat. No. 4,724,392, it is described that there exist magnetic storage systems in which a triboelectric current can be observed between the head/slider combination on one side and the surface of the magnetic disk on the other side in case of rubbing contact between these two interface partners. The above-identified application describes a method for measuring and testing the properties of the interface of a slider carrying ammagnetic transducer head and a disk in a magnetic disk storage apparatus which is characterized by adjusting the rotational speed of the disk such that there is a rubbing contact between the slider and the disk, in that the thus generated triboelectric current between disk and slider is measured during a measuring/testing period, and in that the amplitude curve of this triboelectric current is analyzed over a time period.

This known method deals predominantly with the testing of the disk/slider interface and the lifetime testing of magnetic head sliders and/or magnetic disks respectively. This method does not deal with the question of monitoring the performance of the head/slider combination in cooperation with the disk surface in a magnetic disk storage system, especially under the aspect of avoiding data losses due to upcoming head crashes and disk surface destroying events.

SUMMARY OF THE INVENTION

It is therefore the object of the present invention to provide a method for preventing irreversible data losses in magnetic storage systems due to head/disk interferences such as head crashes and disk surface defects. This method should be able to save the stored data before the storage system is actually destroyed and actual data losses occur.

It is another object to provide a device for preventing data losses due to head/slider disk interferences in magnetic disk storage systems in which a triboelectric current is observed to exist between the slider and the disk surface upon rubbing contact between them when in relative motion to each other.

In accordance with the invention, the objects are achieved by providing a method and apparatus for monitoring the performance of the interface between a magnetic head slider and a magnetic disk in a magnetic disk storage system which comprises measuring the triboelectric current, with a slider that is electrically isolated, that is generated due to rubbing contact between the magnetic head slider and the surface of a magnetic disk, comparing the measured triboelectric current with a preset triboelectric current condition, and generating a saving signal when the comparison indicates that the measured triboelectric current is outside the preset triboelectric current condition so that a data saving action can be initiated before data stored on the magnetic disk is irreversibly destroyed.

In a first specific embodiment, the maximum threshold value of the measured triboelectric current is compared with a preset minimum threshold value and the saving signal is generated when the comparison indicates that the measured maximum threshold value of the triboelectric current is less than the preset minimum threshold value.

In a second specific embodiment, the measured triboelectric current at final disk operating speed is compared with zero and the saving signal is generated when the comparison indicates that the triboelectric current at final disk operating speed is not zero.

In a further specific embodiment, the polarity of the measured triboelectric current is compared with a preselected polarity and the saving signal is generated when the comparison indicates that the polarity of the measured triboelectric current is negative.

The invention provides the possibility of avoiding irreversible data losees of magnetic disk storage systems by monitoring, measuring and analyzing the triboelectric current, and, based on the analyzing results, initiating a data transfer shortly before the end of the lifetime of the data storage system. Thus the loss of valuable data can be avoided as well as avoiding a premature end to the service life of a data storage system.

The foregoing and other objects, features and advantages of the invention will be apparent from the following more particular description of a preferred embodiment of the invention as illustrated in the accompanying drawings.

Brief Description of the Drawing

In the following description of a preferred embodiment of the present invention, the latter is described by means of an example shown in the accompanied drawing in which

FIG. 3 is a plot of the maximum amplitude of the triboelectric current versus time over the lifetime of a disk or a disk storage system respectively;

FIG. 4 is a plot of the triboelectric current versus disk speed during the start-up phase of a disk storage system;

FIG. 5 is a plot of the triboelectric current versus the disk speed during the start-up phase for a slider having debris collection on its rails; and FIG. 6 is a plot of the triboelectric current during start-up phase versus disk speed for the case of current direction change.

DETAILED DESCRIPTION OF THE PREFERRED EMBODIMENTS

Figure 1:
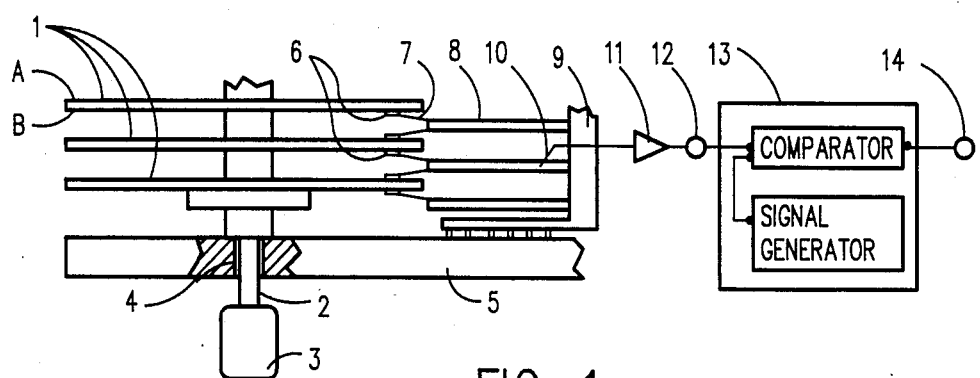
FIG. 1 is a diagrammatic schematic view of a magnetic disk storage system incorporating the present invention.
Figure 2:
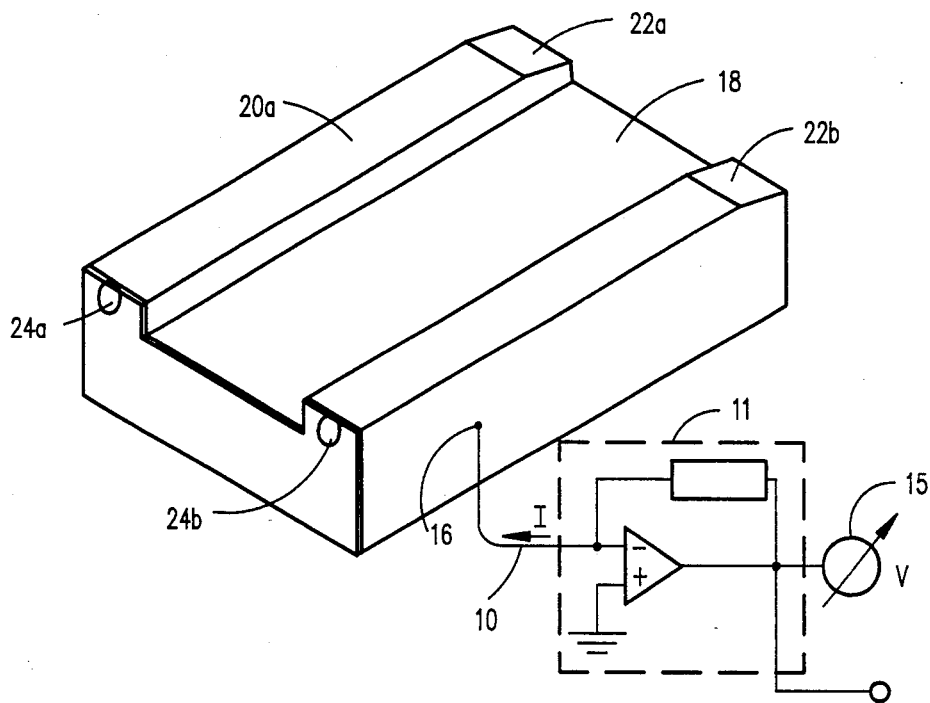
FIG. 2 is a perspective view of a slider of FIG. 1 to which a triboelectric current measuring and indicating device is connected.

With reference to FIGS. 1 and 2, a set-up in accordance with the invention is schematically depicted. This set-up makes it possible to perform the method in accordance with the present invention. FIG. 1 shows a plurality of magnetic disks 1 each having two coated sides A and B. These disks 1 are mounted on a spindle 2, and are rotationally driven by a motor 3. A spindle bearing 4 is contained in a housing 5. With respect to side A of the lowermost disk 1 a slider 6 containing a magnetic head (not shown) is mounted on a suspension 7 and flies over or on the disk respectively upon rotation. Suspension 7 is mounted in a fashion which is electrically isolated on an arm 8 which is fixed to a carriage 9 which is movable with respect to housing 5. An electric connection 10 feeds the measured triboelectric current from slider 6 over suspension 7 and arm 8 into an operational amplifier 11. To the output 12 of amplifier 11 an evaluation and analyzer circuit 13 is connected. This evaluation and analyzer circuit 13 allows to evaluate and analyze the measured triboelectric current and in accordance with the present invention gives a saving signal TRIC at its output 14 under circumstances that are described below.

FIG. 2 shows details of a slider construction in accordance with, for example, U.S. Pat. No. 4,218,715. Slider 18 has two rails 20a and 20b, so-called air bearing surfaces, and is sliding by means of an air bearing over disk surface at an operational speed of approximately 3600 rpm. As is customary, the rails 20a and 20b each start at their leading portion, with respect to a moving track of the rotating disk, with a tapered section 22a and 22b respectively. At the trailing edge of the slider and at the trailing part of the rails 20a and 20b two thin film magnetic transducer heads 24a and 24b are mounted. In accordance with the invention an electric connection 10 is made at point 16 to the body of slider 18. A conductor 10 is provided to connect point 16 to the input of amplifier 11, and the output terminal 12 is coupled to evaluation and analyzing circuit 13. Furthermore there might be provided a meter 15 to indicate the value of the tribo-electric current I flowing between slider 18 and disk surface A of disk 1. Evaluation and analyzing circuit 13 comprises a compare circuit by which the measured triboelectric current from amplifier 11 is compared with a preset triboelectric current condition. The preset triboelectric current condition can be stored in a table, for example, which forms a part of evaluation and analyzing circuit 13. One triboelectric current condition is chosen for each mode, which may comprise the conditions illustrated in FIGS. 4, 5 and 6 and which will be described in detail latter in this application. In one of these cases, a preset minimum value of threshold current level is stored and compared with the measured value of the triboelectric current. The saving signal is generated when the comparison shows that the measured triboelectric current is lower than the preset minimum threshold value. In another case the triboelectric current at final disk operating speed is compared with zero, and the saving signal is generated upon an indication of a non-zero value of the measured triboelectric current. A further case compares the polarity of the measured triboelectric current with a preset polarity, and the saving signal is generated when the comparison indicates that the polarity of the measured triboelectric current is negative.

As can be seen from FIG. 1, only one slider is connected to evaluation and analyzing circuit 13. This is sufficient for a complete disk storage device for the purpose of the present invention. That means that only one head suspension has to be mounted electrically isolated so that triboelectric current I can be measured by a connection fixed to the slider body of one single head. This slider 6 in FIG. 1 together with its suspension 7 mounted on arm 8 is moved together with carriage 9 and all other heads in parallel to position the heads over the desired disk tracks.

The phenomena of triboeleotrio current flowing between a slider and a magnetic disk surface upon rubbing contact between both has been observed in a systm that comprises a ceramic mixture of aluminum oxide ($Al_2O_3$) and titanium carbide (TiC) for the slider. The inclusion of titanium carbide renders slider 6 sufficiently conductive to allow conduction of the triboelectric current.

The magnetic disk used in that system consists of an aluminum magnesium alloy substrate coated with iron oxide ($Fe_2O_3$) and aluminum oxide ($Al_2O_3$) particles dispersed in an epoxy binder.

FIG. 3 shows schematically in a qualitative manner the triboelectric current I over the expected lifetime t of a disk or a disk storage system respectively. As described in the previously referenced Patent Application, the triboelectric current I is very much dependent on changes in the disk/slider interface, on the disk surface, on the slider surface and on the lube quantity, quality and distribution. To obtain an indication of lifetime of the disk/slider assembly to be expected, slider 6 as shown in FIG. 1 is first run-in (conditioned), for example on a first track, and then positioned on another track. In the presence of good sliding properties the triboelectric current I is measured during a testing time in total which is characteristically shown in FIG. 3. In the very beginning, the triboelectric current I around point 30 is about zero and then increases within, for example 15 minutes after the start of the test to a maximum threshold value THV1 at point 31. Then afterwards the amplitude of the triboelectric current decreases slowly. The estimated lifetime can be defined for instance, by the time when the triboelectric current has decayed to a selected percentage of its maximum value. The selected percentage may be, for example, 25% or 10% of the maximum value THV1.

In FIG. 3 there are shown further threshold values beside the maximum threshold value THV1 at timepoint 31, which might be reached after 15 minutes of rubbing test run. At timepoint 32 threshold value THV2 is reached and at timepoint 33 a still smaller threshold value THV3. Also a further smaller threshold value THV4 is reached at timepoint 34. At timepoint 35 a spike SP is shown showing a special phenomena in that the triboelectric current I becomes negative, that means that the flow of the triboelectric current reverses direction. Afterwards at timepoint 36 a threshold value THV5 is reached. Again this value is on the positive side of the value for the triboelectric current I.

The curve of FIG. 3 can be measured by extensive tests, for example, in a measuring time period of 8 hours continuous rubbing contact between slider and disk. The height of maximum of the triboelectric current depends on the rotational speed and on the quantity and quality of the lube distributed over the disk surface. To obtain the triboelectric current, there must be a frictional, i.e. rubbing contact between disk and slider. For this purpose a rotational speed of 100 to 500 rpm is chosen which results in a flying height of 0–100 nm. Under these set conditions the curve of FIG. 3 can be measured. The result of this measurement, for example, are stored in the evaluation and analyzing circuit 13 shown in FIG. 1 for purposes to be described. In normal operation of a disk storage system, a curve such as that shown in FIG. 3 cannot be measured. However, during the normal operation of a magnetic disk storage system that is provided with the set-up shown in FIGS. 1 and 2, upon each START phase of the disk storage and during normal operation, the triboelectric current I can be measured and observed.

When the magnetic disk storage system is not in use, the disks are not rotating and the magnetic heads are resting on a certain START/STOP area of the disk. Upon each START of the magnetic disk storage system, the disks are accelerated from 0 rotational speed to a final rotational speed, the so-called operational speed of about 3600 rpm, for example. During a rotational speed up to about 600 rpm, the slider and the disk are in rubbing contact. Above that speed up to about 1200 rpm the slider starts to take off from the disk surface and only some occasional rubbing contact is observed. From a speed of about 1200 rpm up to the operational speed, there should be no contact between the slider and the disk surface.

FIG. 4 describes, for a conditioned track the curves for the triboelectric current I during such a START phase just described. Over the rotational speed n, measured in revolutions per minute (rpm), the triboelectric current I is depicted. Curve 431 corresponds to the point 31 in lifetime curve of FIG. 3 and has a threshold value THV1 that is the maximum threshold value and corresponds to threshold value THV1 of FIG. 3. As curve 431 shows, the triboelectric current increases dependent on the rotational speed with increasing speed to the shown maximum value THV1 and then afterwards decreases with increasing rotational speed. At an operational speed of about 3600 rpm, the triboelectric current I is 0 during normal operation. The current must be 0 then, because at that operational speed there should be no contact between slider and disk and therefore there should be no triboelectric current present.

FIG. 4 shows, with curve 432, another example for the behavior and value of the triboelectric current I during another start phase and during another timepoint in the lifetime of the disk storage system. This lifetime might be point 32 of FIG. 3 and the maximum amplitude for the triboelectric current I at that point in time corresponds to threshold value THV2.

In accordance with one embodiment of the present invention this start-up phase observation shown in FIG. 4 reveals the fact if the triboelectric current I during START phase reaches a certain threshold value. Comparing the maximum threshold value of triboelectric current I against a preset minimum threshold value THVmin gives the possibility to initiate a saving action for the stored data before an irreversible data loss occurs. The minimum threshold value THVmin can be preset in accordance with tests for the lifetime of a disk storage system of comparable kind as well as with values that have been found to be representative for the longest possible lifetime in connection with the minimal allowable maximum threshold value for the triboelctric current I during START phase. This is one event against which the triboelectric current I is measured, analyzed and compared. If this comparison shows that the maximum value reaceed for the triboelectric current I during a specific START phase is smaller than the preset minimum threshold value, then at the output 14 of the evaluation and analyzer circuit 13 of FIG. 1 the saving signal TRIC is generated. This signal TRIC is usable to initiate a data saving procedure, either automatically or by intervention of the operator of the system.

In connection with FIG. 5, there is described another event which, in connection with a second embodiment of the present invention, is used to generate the saving signal TRIC. If there is a massive accumulation of debris at the rails of the slider, there might be a constant contact between this slider and the disk surface even at operational speed of 3600 rpm. In this case triboelectric current I is flowing and can be measured. That means, as shown with curve 536 in FIG. 5, that current I does not become 0 at operational speed of 3600 rpm. That means that the triboelcctric current does not disappear at operational speed and in the start phase has not diminished toward 0. This is a clear indication that there is contact between slider and disk during operation of the disk storage. That also means that, at operational speed on the disk surface, a rubbing slider will most probably destroy the disk surface underneath it. This is a further event for initiating the saving action by generating the saving signal TRIC at output 14 of evaluation and analyzer circuit 13.

In connection with FIG. 6, a further possible event in observing the triboelectric current during start-up phases is shown. The triboelectric current I is monitored during each start phase to determine if it accepts a negative value, that means if it becomes less than 0 or in other words does flow in a direction opposite to the usually observed current flow direction. This especially might occur at a timepoint 36 shown in FIG. 3 and is depicted with curve 636 in FIG. 6, showing first a positive value and afterwards a negative value for the current I during the START phase. In any case, this is also an event which is monitored, and if observed triggers the generation of the saving signal TRIC at output 14 of evaluation and analyzing circuit 13.

This evaluation and analyzing circuit 13 can also be used to evaluate a fourth event. This fourth possible event is observing the behavior of the triboelectric current and monitoring the same during the total operation of the disk storage system. If at any point in time during normal operation a triboelectric current occurs, this hints at a contact between disk and slider. If those head-disk-interferences occur, the danger for irreversible data losses due to destroyed disk surface areas is to be expected. Therefore, it is advisable also in those cases to initiate a data saving action. This is possible by generating also in this case the saving signal TRIC.

The present invention by its method and its device presents the advantage that at different events a saving operation can be initiated before irreversible data lssses due to head-disk-interferences occur. By measuring, monitoring, evaluating and analyzing the triboelectric current that flows under certain circumstances between a magnetic head slider and the disk surface, a saving action can be initiated to prevent irreversible losses of data stored on the monitored magnetic data storage system. Those events are: during START phase the triboelectric current should reach a minimum threshold value, should not become negative, i.e. accept a flow direction opposite to the usually observed flow direction, and become 0 at the end of the START phase upon reaching operational speed. Furthermore no triboelectric current should occur during normal operation.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A method for monitoring the performance of the interface between a magnetic head/slider combination and a magnetic disk in a magnetic disk storage system, in which a triboelectric current is generated due to rubbing contact between the slider and the disk surface, said method comprising the steps of:
   measuring the triboelectric current generated due to rubbing contact between a magnetic head slider and the surface of a magnetic disk;
   comparing the measured triboelectric current with a preset triboelectric current condition; and
   generating a saving signal when the comparing step indicates that the measured triboelectric current is outside the preset triboelectric current condition so that a data saving action can be initiated before data stored on said magnetic disk is irreversibly destroyed.

2. The method of claim 1, wherein said comparing step comprises comparing the maximum threshold value of the measured triboelectric current with a preset minimum threshold value and said saving signal is generated when the comparing step indicates that the measure maximum threshold value of the triboelectric current is less than said preset minimum threshold value.

3. The method of claim 1, wherein said comparing step comprises comparing the measured triboelectric current at final disk operating speed with zero and said saving signal is generated when the comparing step indicates that the triboelectric current at final disk operating speed is not zero.

4. The method of claim 1, wherein said comparing step comprises comparing the polarity of the triboelectric current with a preselected polarity and said saving signal is generated when the comparing step indicates that the polarity of the measured triboelectric current is negative.

5. The method of claim 1, wherein said measuring step is carried out during a start phase between the time of first relative motion between said slider and said surface of said magnetic disk and the time said relative motion reaches a predetermined final disk operation speed.

6. The method of claim 5, wherein said comparing step comprises comparing the maximum threshold value of the measured triboelectric current with a preset minimum threshold value and said saving signal is generated when the comparing step indicates that the measured maximum threshold value of the triboelectric current is less than said preset minimum threshold value.

7. The method of claim 5, wherein said comparing step comprises comparing the measured triboelectric current at said final disk operating speed with zero and said saving signal is generated when the comparing step indicates that the triboelectric current at said final disk operating speed is not zero.

8. The method of claim 5, wherein said comparing step comprises comparing the polarity of the triboelectric current with a preselected polarity and said saving signal is generated when the comparing step indicates that the polarity of the measured triboelectric current is negative.

9. An apparatus for monitoring the performance of the interface between a magnetic head/slider combination and a magnetic disk in a magnetic disk storage system, in which a triboelectric current is generated due to rubbing contact between the slider and the disk surface, said apparatus comprising:
   a magnetic head slider and means for electrically isolating said slider from the remainder of said magnetic disk storage system;
   means for measuring the triboelectric current generated due to rubbing contact between said magnetic head slider and the surface of a magnetic disk;
   means for comparing the measured triboelectric current with a preset triboelectric current condition; and
   means for generating a saving signal in response to a signal from said means for comparing which indicates that the measured triboelectric current is outside the preset triboelectric current condition so that a data saving action can be initiated before data stored on said magnetic disk is irreversibly destroyed.

10. The apparatus of claim 9 wherein said means for comparing is operable to compare the maximum threshold value of the measured triboelectric current with a preset minimum threshold value and said means for generating a saving signal is responsive to a signal which indicates that the measured maximum threshold value of the triboelectric current is less than said preset minimum threshold value.

11. The apparatus of claim 9 wherein said means for comparing is operable to compare the measured triboelectric current at final disk operating speed with zero and said means for generating a saving signal is responsive to a signal which indicates that the triboelectric current at final disk operating speed is not zero.

12. The apparatus of claim 9 wherein said means for comparing is operable to compare the polarity of the triboelectric current with a preselected polarity and said means for generating a saving signal is responsive to a signal which indicates that the polarity of the measured triboelectric current is negative.

13. The apparatus of claim 9 wherein said means for measuring is operable during a start phase between the time of first relative motion between said slider and said surface of said magnetic disk and the time said relative motion reaches a predetermined final disk operation speed.

14. The apparatus of claim 13 wherein said means for comparing is operable to compare the maximum threshold value of the measured triboelectric current with a preset minimum threshold value and said means for generating a saving signal is responsive to a signal which indicates that the measured maximum threshold value of the triboelectric current is less than said preset minimum threshold value.

15. The apparatus of claim 13 wherein said means for comparing is operable to compare the measured triboelectric current at final disk operating speed with zero and said means for generating a saving signal is responsive to a signal which indicates that the triboelectric current at final disk operating speed is not zero.

16. The apparatus of claim 13 wherein said means for comparing is operable to compare the polarity of the triboelectric current with a preselected polarity and said means for generating a saving signal is responsive to a signal which indicates that the polarity of the measured triboelectric current is negative.

* * * * *